United States Patent [19]

Bowman

[11] 3,910,863
[45] Oct. 7, 1975

[54] ARALKYL HALIDE COACCELERATOR

[75] Inventor: Edward L. Bowman, Alexandria, Va.

[73] Assignee: Phillips Petroleum Company, Bartlesville, Okla.

[22] Filed: Jan. 24, 1973

[21] Appl. No.: 326,321

Related U.S. Application Data

[63] Continuation of Ser. No. 150,233, July 4, 1971, abandoned.

[52] U.S. Cl. ...... 260/79.5 B; 260/23.7 M; 260/783; 260/784; 260/785; 260/798
[51] Int. Cl.² ................ C08C 11/62, C08C 11/44, C08C 11/24; C08D 9/00
[58] Field of Search ....... 260/79.5 B, 783, 784, 785, 260/798

[56] References Cited
UNITED STATES PATENTS

| | | | |
|---|---|---|---|
| 2,567,135 | 9/1951 | Sturgis | 260/41.5 R |
| 2,891,926 | 6/1959 | Doak | 260/41.5 |

Primary Examiner—Christopher A. Henderson, Jr.

[57] ABSTRACT

A method of compounding unsaturated elastomers which comprises employing with the elastomer a sulfur-based curing system and a defined aralkyl halide additive. A vulcanizable composition is also disclosed.

12 Claims, No Drawings

ARALKYL HALIDE COACCELERATOR

This is a continuation of my application Ser. No. 150,233, filed June 4, 1971 now abandoned.

This invention relates to rubber compounding additives.

In one of its more specific aspects, this invention relates to the use of aralkyl halides in the vulcanization of rubber. least With the increasing use of butadiene-styrene copolymer rubbers, there is a continuing need for vulcanizing agents which improve the aging properties of elastomers at elevated temperatures. A number of nonsulfur vulcanizing agents have been employed, some quite successfully. Among those which have been generally suggested are the chlorinated aryl methyl compounds containing at least one chlorine substituted in the methyl group, for example, benzal chloride and o-chlorobenzotrichloride, their use being proposed in the absence of sulfur in the curing system.

It has now been discovered that certain halogenated arly methyl compounds when employed in the presence of sulfur, produce surprisingly effective results. This invention is concerned with such compounding additives.

According to this invention there is provided a method for compounding unsaturated elastomers which comprises compounding the elastomer with a sulfurbased curing system and with an aralkyl halide additive having the formula

in which R is selected from the group consisting of hydrogen and an aryl radical having from about 6 to about 16 carbon atoms, only one of the R groups being hydrogen, and in which X is selected from the group consisting of chlorine, bromine and iodine. Each R may be alike or the R groups may differ from each other.

Also according to this invention there is provided a vulcanizable composition comprising an elastomer and a vulcanizing agent comprising a sulfur-based curing system and an aralkyl halide additive as defined above.

This invention is applicable to the curing of what are conventionally referred to as highly unsaturated elastomers including cis-polyisoprene, natural rubber, emulsion polymerized butadiene-styrene copolymers, solution polymerized butadiene-styrene copolymers and polybutadiene.

Example of suitable compounds complying to the foregoing formula are compounds such as bromodiphenylmethane, bromodiphenyl-p-tolylmethane, bromodi-1-naphthylmethane, bromodi-2,5-xylymethane, chlorobis(2,6-diisopropylphenyl)methane, chlorobis(o-ethylphenyl)methane, chlorobis(m-neopentylphenyl)-phenylmethane, chlorodi-o-cumenylmethane, chloro(-2,6-diethylphenyl)(o-ethylphenyl)methane, chloro(2,6-diethylphenyl)phenylmethane, chlorodiphenyl-p-tolylmethane, chlorodi-1-pyrenylmethane, chlorophenyl-p-tolylmethane, chlorophenyl-o-tolylmethane, chlorotriphenylmethane, chlorotri-1-pyrenylmethane, chlorotri-p-tolylmethane, chlorodi-1-naphthylmethane, iodotriphenylmethane, and the like, and mixtures thereof. These materials are used in concentrations within the range of from about 0.1 to about 10 phr with best results being obtained at concentrations within the range of from about 1 to about 4 phr.

The aforementioned compounds are employed with sulfur-based vulcanization systems of the conventional type which include sulfur or compounds which liberate sulfur such as dipentamethylene thiuram hexasulfide and with classes of compounds such as aldehyde-amines, guanidines, thiazoles, dithiocarbamates and thiuram sulfides which act as vulcanization accelerators, and with accelerator activators such as zinc oxide, litharge, stearic acid, zinc stearate, triethanolamine and the like. These sulfur-based curing systems can be used in conjuction with other conventional compounding materials such as carbon black.

The aforementioned aralkyl halide additives are employed under conventional conditions of curing time, temperature and techniques, which conditions form no part of the invention. When so employed, the use of the aralkyl halide additives act to initially retard cure as shown by an increase in curing induction time or scorch time. At longer cure times, they produce a degree of crosslinking which is higher than can be obtained with a conventional cure system, indicating a more efficient use of sulfur. The cured system is also highly resistant to reversion.

These advantages and unexpected results of the invention are illustrated in the following examples. In these examples, the method of this invention will be illustrated employing chlorotriphenylmethane and certain other substances. However, the invention is not be to be considered as being limited to the materials employed.

EXAMPLE I

In a series of runs, chlorotriphenylmethane (CTPM) was incorporated into three different rubbers in an amount of 3 parts by weight per hundred parts by weight of rubber. Each rubber lacking the inclusion of the CTPM was also evaluated. The compounds were prepared by incorporating CTPM in the elastomer stock, adding sulfur and a vulcanization accelerator in conventional amounts, mixing and sheeting off the stock in a conventional manner. Curing characteristics of the compounds were determined in a Monsanto Rheometer at 307°F. and physical properties of each of the stocks cured for 45 minutes at 307°F. were also determined. Results were as follows:

TABLE I

| Rubber No. | Rubber Type | Monsanto Rheometer at 307°F. | | | |
|---|---|---|---|---|---|
| | | CTPM conc., phr | Max. Visc., in.-lbs. | Scorch, (4 in.-lbs.) min. | Cure Rate, in.-lbs./min. |
| 1 | SBR-1500 | 0 | 67 | 6.5 | 6.2 |
| 2 | SBR-1500 | 3 | 83 | 11.2 | 2.8 |
| 3 | Natural | 0 | 52 | 5.5 | 3.9 |
| 4 | " | 3 | 61 | 6.2 | 3.0 |
| 5 | High cis-polybutadiene | 0 | 73 | 9.7 | 6.4 |
| 6 | " | 3 | 78 | 10.0 | 2.9 |

TABLE I-Continued

| Rubber No. | Physical Properties - Cured 45 min. at 307°F. | | |
|---|---|---|---|
| | Crosslinking Vr | 300% Modulus, psi | Heat Build-up (ΔT), °F. |
| 1 | 0.427 | 1785 | 75 |
| 2 | 0.452 | 2375 | 64 |
| 3 | 0.306 | 1535 | 59 |
| 4 | 0.335 | 1930 | 46 |
| 5 | 0.407 | 1050 | 61 |
| 6 | 0.417 | 1345 | 56 |

In the above data, the crosslinking value is a measure of the degree of cure, employing Vr, the volume fraction of polymer in solvent-swollen cured stock as discussed in Rubber World, 135, No. 1, 67–73 (1956).

The above data demonstrate that the use of the CTPM results in the production of stocks of slower cure rate and increased scorch time, yet with higher degree of cure in the vulcanized stocks. This is also indicated by the higher modulus and the lower heat build-up for those stocks containing CTPM.

EXAMPLE II

Samples of a compounded recipe comprised, in parts by weight, of 100 parts natural rubber (No. 1 smoked sheets), 50 parts carbon black, 2.5 parts sulfur and the usual amounts of zinc oxide, stearic acid, extender oil and accelerator had incorporated in them various quantities of CTPM. The stocks were mixed in the conventional manner and were tested as follows after 45 min. cure at 307°F.

TABLE II

| Stock No. | 1 | 2 | 3 |
|---|---|---|---|
| CTPM, phr | 0 | 1 | 2 |
| Tensile, psi | 3600 | 3900 | 4000 |
| 400% Modulus, psi | 2600 | 2800 | 3500 |
| Elongation, % | 510 | 515 | 440 |
| Shore A. Hardness | 66 | 66 | 70 |
| Resilience, % | 62 | 63 | 67 |

The above data indicate that the addition of CTPM improves certain of the properties of the resulting stocks.

EXAMPLE II

That the additives of this invention produce stocks having a decreased cure rate but an increased modulus, indicating a higher degree of cure is shown by the following data in which solution polymerized butadiene-styrene random copolymers and emulsion polymerized butadiene-styrene copolymers were used as the basic rubbers in stocks comprising carbon black, sulfur and other usual ingredients in which CTPM was incorporated in various amounts with the following results:

TABLE III

| Rubber | Solution | Solution | Emulsion | Emulsion |
|---|---|---|---|---|
| CTPM, phr | 0 | 3 | 0 | 3 |
| Monsanto Rheometer Cure Characteristics at 307°F. | | | | |
| Max. Visc., (60 min.) in.-lbs. | 64 | 84 | 65 | 80 |
| Scorch (4 in.-lbs.) min. | 11.2 | 11.6 | 8.5 | 11.5 |
| Cure Rate, in.-lbs./min. | 7.3 | 3.7 | 4.2 | 2.8 |
| Properties, Stocks Cured 45 min. at 307°F. | | | | |
| Tensile, psi | 3795 | | 3290 | 4500 | 3870 |
| 400% Modulus | 2210 | | 2910 | 2360 | 2830 |
| Elongation, % | 585 | | 445 | 610 | 490 |

The above data indicate that the invention is applicable to both solution and emulsion polymerized rubbers.

EXAMPLE IV

That the compounds of the present invention benefit from the presence of sulfur and that the effect of the compounds of this invention is greater than the additive effect of the sulfur-containing system and of the aralkyl halide, individually, is shown by the test results of four stocks comprised of natural rubber. Other conventional components were varied only to the extent of the sulfur and CTPM incorporated in them, with the following results:

Table IV

| Rubber | 1 | 2 | 3 | 4 |
|---|---|---|---|---|
| Sulfur, phr | 0 | 1.25 | 2.5 | 2.5 |
| CTPM, phr | 3 | 3 | 3 | 0 |
| Monsanto Rheometer Cure Characteristics at 307°F. | | | | |
| Max. Visc., in.-lbs. | Did | 66 | 80 | 59 |
| Scorch (5 in.-lbs.) min. | not | 6.5 | 5.1 | 4.5 |
| Cure Rate, in.-lbs./min. | cure | 2.2 | 3.7 | 3.8 |
| Properties, Stocks Cured 45 min. at 307°F. | | | | |
| Tensile, psi | Did not determine | 4120 | 3950 | 3260 |
| 300% Modulus, psi | | 1965 | 2450 | 1750 |

EXAMPLE V

Materials representative of those materials which are the subject of this invention and various chlorine-containing compounds were incorporated in substantially identical quantities into a butadiene-styrene rubber (SBR-1500) stock with carbon black, sulfur and other components normally included in rubber recipes. The resulting stocks were prepared, blended, and tested with the following results:

TABLE V

| Additive | Rubber Number | | | | |
|---|---|---|---|---|---|
| | 1 | 2 | 3 | 4 | 5 |
| | None | CTPM | Benzo-trichloride | o-chloro-benzo-trichloride | chloro-diphenyl-methane |
| Monsanto Rheometer Cure Characteristics at 307°F. | | | | | |
| Max. Visc., in.-lbs., 60 min. | 68 | 77 | 83 | 100 | 70 |
| Scorch (4 in.-lbs.), min. | 9.7 | 11.0 | 5.5 | 8.3 | 11.5 |
| Cure Rate, in.-lbs./min. | 4.9 | 3.4 | 2.7 | 4.7 | 2.8 |

TABLE V -Continued

| Additive | Rubber Number | | | | |
|---|---|---|---|---|---|
| | 1 | 2 | 3 | 4 | 5 |
| | None | CTPM | Benzo-trichloride | o-chloro-benzo-trichloride | chloro-diphenyl-methane |
| Properties, Stocks Cured 45 min. at 307°F. | | | | | |
| Tensile, psi | 4075 | 3550 | 3890 | 3230 | 4200 |
| 300% Modulus, psi | 1425 | 1650 | 1695 | 2660 | 1275 |
| Elongation, % | 550 | 480 | 530 | 345 | 610 |
| V × 10⁴, moles/cc.* | 1.54 | 1.66 | 1.66 | 2.22 | 1.47 |

*A crosslink density measured as moles of crosslinks per cc of rubber and calculated from the method of determining Vr.

The above results demonstrate that the additives of this invention, that is, additives 2 and 5, produce slow curing but scorch-resistant stocks of good physical properties. The use of benzotrichloride provided a slow curing but scorchy stock while the use of o-chlorobenzotrichloride produces a faster curing stock than did the use of benzotrichloride but a stock scorchier than that produced in the absence of an additive.

It is evident from the foregoing that various modifications can be made to the method of this invention. However, such are considered to be within the scope of the invention.

What is claimed is:

1. A method of vulcanizing a highly unsaturated elastomer which comprises:
   a. forming a composition comprising:
      1. a sulfur vulcanizable highly unsaturated elastomer;
      2. a sulfur-based curing system; and,
      3. an aralkyl halide having the formula

wherein R is selected from the group consisting of hydrogen and an aryl radical having from about 6 to about 16 carbon atoms with not more than one of said R groups being hydrogen and,
   b. curing said composition.

2. The method of claim 1 in which said sulfur-based curing system comprises sulfur or compounds of which liberate sulfur.

3. The method of claim 2 in which said aralkyl halide is incorporated in said composition in an amount within the range of from about 0.1 to about 10 parts by weight per hundred parts by weight of said elastomer.

4. The method of claim 1 in which said aralkyl halide is selected from the group consisting of chlorobis(2,6-diisopropylphenyl)methane, chlorobis(o-ethylphenyl)methane, chlorobis(m-neopentylphenyl)-phenylmethane, chlorodi-o-cumenylmethane, chloro(-2,6-diethylphenyl)(o-ethylphenyl)methane, chloro(2,-6-diethylphenyl)phenylmethane, chlorodiphenyl-p-tolylmethane, chlorodi-1-pyrenylmethane, chlorophenyl-p-tolylmethane, chlorophenyl-o-tolylmethane, chlorotriphenylmethane, chlorotri-1-pyrenylmethane, chlorotri-p-tolylmethane, and chlorodi-1-naphthylmethane.

5. The method of claim 4 in which said aralkyl halide comprises chlorotriphenylmethane.

6. The method of claim 5 in which said chlorotriphenylmethane is incorporated in said elastomer in an amount of about 3 parts per hundred parts of said elastomer.

7. A composition comprising a highly unsaturated vulcanizable elastomer, a sulfur-based curing system and an aralkyl halide having the formula

wherein R is selected from the group consisting of hydrogen and an aryl radical having from about 6 to 16 carbon atoms with not more than one of said R groups being hydrogen.

8. The composition of claim 7 in which said aralkyl halide is selected from the group consisting of chlorobis-(2,6-diisopropylphenyl)methane, chlorobis(o-ethylphenyl)methane, chlorobis-(m-neopentylphenyl)-phenylmethane, chlorodi-o-cumenylmethane, chloro(-2,6-diethylphenyl)(o-ethylphenyl)methane, chloro(2,- -6-diethylphenyl)phenylmethane, chlorodiphenyl-p-tolylmethane, chlorodi-1-pyrenylmethane, chlorophenyl-p-tolylmethane, chlorophenyl-o-tolylmethane, chlorotriphenylmethane, chlorotri-1-pyrenlymethane, chlorotri-p-tolylmethane, and chlorodi-1-naphthylmethane.

9. The composition of claim 7 in which said aralkyl halide is present in an amount within the range of from about 0.1 to about 10 parts per hundred parts by weight of said elastomer.

10. The composition of claim 7 in which said aralkyl halide is chlorotriphenylmethane.

11. The method of claim 5 wherein said elastomer is selected from the group consisting of natural rubber, polyisoprene, butadiene-styrene copolymers, polybutadiene, and butadiene-acrylonitrile copolymers and the sulfur-based curing system comprises sulfur and a vulcanization accelerator selected from the group consisting of aldehydeamines, guanidines, thiazoles, dithiocarbamates, and thiuram sulfides.

12. The composition of claim 7 wherein said elastomer is selected from the group consisting of natural rubber, polyisoprene, butadiene-styrene copolymers, polybutadiene, and butadiene-acrylonitrile copolymer and the sulfur-based curing system comprises sulfur and a vulcanization accelerator selected from the group consisting of aldehyde-amines, guanidines, thiazoles, dithiocarbamates, and thiurum sulfides.

* * * * *

UNITED STATES PATENT AND TRADEMARK OFFICE
CERTIFICATE OF CORRECTION

PATENT NO. : 3,910,863

DATED : October 7, 1975

INVENTOR(S) : Edward L. Bowman

It is certified that error appears in the above–identified patent and that said Letters Patent are hereby corrected as shown below:

Column 5, line 47, after "compounds" delete "of".

Column 6, line 28, before "16" insert ---- about ----

Signed and Sealed this thirteenth Day of April 1976

[SEAL]

Attest:

RUTH C. MASON  
*Attesting Officer*

C. MARSHALL DANN  
*Commissioner of Patents and Trademarks*